United States Patent [19]

Drisko et al.

[11] Patent Number: 4,963,036
[45] Date of Patent: Oct. 16, 1990

[54] VISION SYSTEM WITH ADJUSTMENT FOR VARIATIONS IN IMAGED SURFACE REFLECTIVITY

[75] Inventors: Robert A. Drisko, Monroeville; Jeffrey D. Taft, Plum Boro, both of Pa.

[73] Assignee: Westinghouse Electric Corp., Pittsburgh, Pa.

[21] Appl. No.: 327,077

[22] Filed: Mar. 22, 1989

[51] Int. Cl.⁵ .............................................. G06K 9/00
[52] U.S. Cl. ........................................ 382/50; 382/51; 382/53; 382/65; 364/478; 342/64; 901/45
[58] Field of Search ..................... 382/18, 51, 50, 53, 382/65; 250/574, 230; 353/37; 901/44, 45, 47; 364/478

[56] References Cited

U.S. PATENT DOCUMENTS

| | | | |
|---|---|---|---|
| 4,396,903 | 8/1983 | Habicht et al. | 342/64 |
| 4,613,269 | 9/1986 | Wilder et al. | 364/478 |
| 4,670,974 | 6/1987 | Antoszewski et al. | 901/45 |
| 4,691,240 | 9/1987 | Kurusu et al. | 382/50 |

Primary Examiner—Leo H. Boudreau
Assistant Examiner—Yon Jung
Attorney, Agent, or Firm—G. E. Hawranko

[57] ABSTRACT

The image pipeline for a vision system includes a series of digital image processing boards controlled by a computer. A video camera generates from a laser beam reflected from the target surface an RS-170 analog video signal which is converted to a digital signal for processing. Bins of digitizing parameters suitable for several target surface reflectivities are stored in computer memory. The appropriate bin is selected from histogram data of pixel intensity levels generated by one of the image processing boards using digitizing parameters from a reference bin. Improved imaging, especially of black surfaces, is achieved by scanning a laser beam to generate a light stripe over a number of image frames using the digitizing parameters from the selected bin and integrating the data from the successive frames using the image processing boards.

23 Claims, 9 Drawing Sheets

4,963,036

VISION SYSTEM WITH ADJUSTMENT FOR VARIATIONS IN IMAGED SURFACE REFLECTIVITY

BACKGROUND OF THE INVENTION

1. Field of the Invention

This invention relates to a vision system which generates digital signals representative of an image of light reflected from a target object. It includes such a system which makes adjustments in the digitizing parameters for variations in surface reflectivity of the target object.

2. Background Information

Vision systems for use with computer controlled systems generate digital signals for processing by a digital computer. Such vision systems sense light reflected from a target object typically using a video camera. In a structured light system, a set pattern of light such as for example a light stripe is projected onto the target object. Alterations in the light pattern reflected by the target object produce digital signals which are analyzed by the digital computer to make any number of desired determinations, such as the orientation, size, shape, movement, or distance of the object from the vision system sensors.

An example of such a computer controlled system having a vision capability is the automated windshield insertion system disclosed in U.S. Pat. No. 4,670,974. In this system, a robot tracks an automobile moving on a production line conveyor, senses the exact location of the windshield opening despite wide tolerance in the position of the car on the conveyor and precisely places the windshield in the opening of the moving vehicle. The sensors used by this robot include three vision sensors which sense the intersection of the opening for the windshield with the roof and the two side posts.

The vision system used in the windshield insertion system disclosed in U.S. Pat. No. 4,670,974 creates a structured light pattern on the windshield opening using ordinary projector bulbs and lenses. This system works well on most colors of cars, but has difficulty in detecting the light reflected from black cars. Black is the ideal absorber. This absorption effect coupled with the very high gloss finish on some cars makes the detection of light of any angle other than the specular very difficult. Ordinary light stripe projectors with currently available laser diodes do not produce enough light to draw adequate stripes on black cars.

There is a need therefore for a vision system which can be used with target objects having widely varying surface reflectivities.

More particularly, there is a need for a vision system which can automatically accommodate for wide variations in the surface reflectivity of target objects.

There is a related need for a vision system that can create a structured light pattern with sufficient power density to detect black target objects.

There is a need for such a vision system which can generate such a light pattern with a high power density using commonly available low cost light sources.

SUMMARY OF THE INVENTION

These and other needs are satisfied by the invention which is directed to a vision system which utilizes a frame integration process to build a stripe from a number of laser dots. A single laser dot has a greater power density than a projected stripe because of the area reduction. Thus, sufficient reflected light can be obtained from a black surface using conveniently available laser diode sources. A computer is used to synchronize the stripe generation with the frame integration process. In addition, the system of the invention includes means for automatically detecting and differentiating between different paint finishes, and selecting digitizing parameters for use in stripe generation appropriate for the detected finish.

More particularly, the invention is directed to a vision system in which a light source directs a beam of light at the target surface and a video camera converts light reflected from the target surface into an analog electrical signal representing an image of the light beam on the target surface. An analog to digital converter converts the analog signal into a digital signal containing digital values corresponding to light intensity at each pixel in the image array. The system further includes means which generates histogram data from the digital values for the pixels In the most basic form of the invention, the computer stores in memory at least two levels of a digitizing parameter and is programmed to select one of these levels as a function of the histogram data. The selected level of the digitizing parameter is applied to means which adjusts the digital values. In the preferred form of the invention, the computer stores in bins sets of levels for multiple digitizing parameters with each bin storing a selected level for each of the multiple digitizing parameters. The computer is programmed to select the set of levels for the multiple digitizing parameter stored in one of the bins as a function of the histogram data.

In the exemplary embodiment of the invention, the digitizing parameters include gain for a variable gain amplifier which adjusts the amplitude of the analog signal converted into the digital values, an offset which is applied by an offset circuit to the analog signal, and a threshold level which is used to analyze the histogram data to determine the bin of digitizing parameters to be selected, or during stripe generation, to select features of the image. One of the bins includes reference values for the digitizing parameters. These reference parameters are used in generating the histogram data. The total number of pixels determined from the histogram data having intensity levels above the reference threshold is then compared with the bin fill level limits to select the parameter bin containing the digitizing parameters used for generating the light stripe.

As another aspect of the invention, the computer controls a scanner which advances the light beam across the target surface over a period of several video frames to draw a stripe on the target surface. In this manner, the intensity of the light reflected from the target surface is much greater since it is concentrated in a small segment of a stripe rather than being spread across the entire stripe as with a conventional light stripe projector. The analog signal is converted into a digital signal containing digital values corresponding to light intensity at each pixel in the array for each frame. A frame integrator integrates the digital values of the digital signal for each pixel for each of the several frames to generate composite digital values for each pixel. A processing means identifies pixels having composite digital values above the threshold value in the digitizing parameter bin selected by the digital computer as representing the stripe on the target surface.

Thus, initially, the beam is directed at a fixed point on the target surface and the reference values of the gain and offset are used in generating the histogram data. The reference threshold is then used to determine from the histogram data the bin containing the gain, offset and threshold levels to be used for stripe generation. During stripe generation, the threshold level from the selected bin is used to determine the features of the image, that is, the pixels in the array which have intensity levels above the threshold level.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
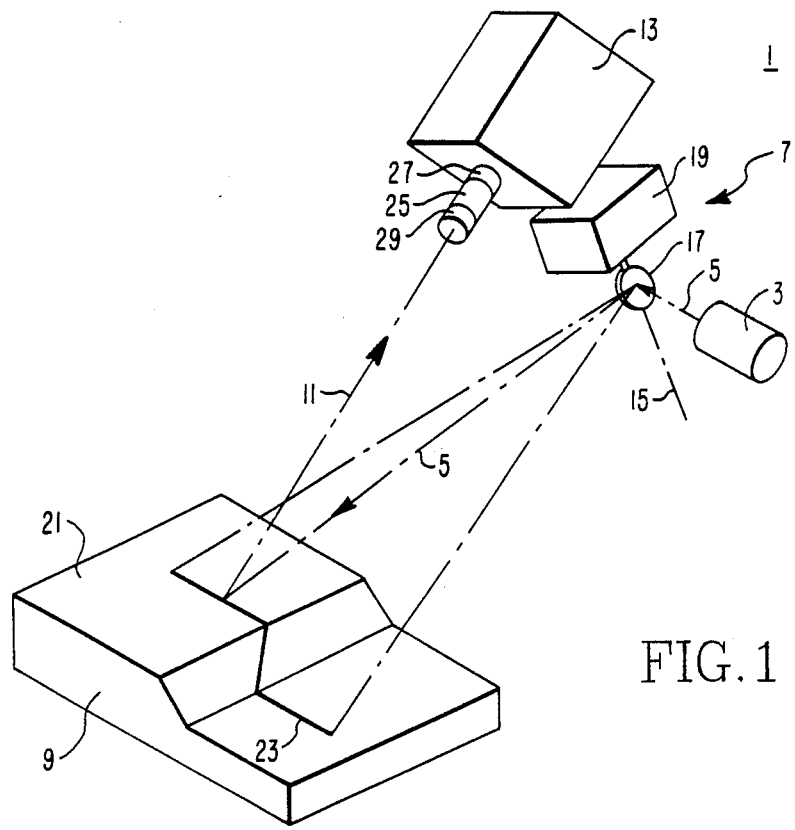
FIG. 1 is an isometric schematic view of the sensor which forms part of the vision system of the invention.

Referring to FIG. 1, the vision system of the invention includes a sensor 1 comprising of a light source 3 which generates a beam of light 5 which is deflected by a scanner 7 onto a target object 9. Light 11 reflected from the target object is gathered by a video camera 13. The light source 3 is an inexpensive laser diode with a collimating lens which emits laser light at a wavelength of 780 nm. Output power is adjustable, however, the laser diode in the exemplary system operates at about 10 mW. The light beam 5 is projected at a 90 degree angle with respect to the axis 15 of the scanner 7. The scanner 7 is galvanometer scanner consisting of a mirror 17 which is rotated about the axis 15 by a repositionable servomotor 19.

The galvanometer scanner 7 is used to scan the laser spot along a straight line forming in effect a plane of light intersecting the target object 9 to form on the surface 21 thereof a stripe 23. In accordance with the invention, the stripe 23 is actually made up of a series of small segments as will be discussed more fully below. The position of scanner 7 is controlled by a computer which forms part of the vision system.

The light stripe 23 projected onto the surface 21 is imaged by the video camera 13. This camera 13 is a solid state charge coupled device (CCD) camera such as a Sony TM-540R CCD camera. The camera 13 uses a 16 mm bayonet lens 25 with a 1 mm spacer 27 and a narrow band filter 29 mounted to the front of the camera lens. The pass band of the narrow band filter 25 is centered at 780 nm and has a pass band of 30 nm. This pass band accommodates any drift in diode wavelength due to temperature change while effectively filtering out ambient light.

Figure 2:
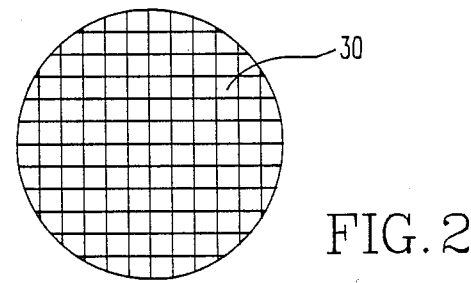
FIG. 2 is a fragmentary view of the array of pixels used by a camera which forms part of the sensor of FIG. 1 to convert reflected light into an electrical signal.

The camera 13 has a 512×485 array of pixels 30 as shown schematically in the fragmentary view of FIG. 2. Each pixel 30 comprises a charge coupled device (CCD) which stores electric charge in proportion to the intensity of light impinging thereon. The camera sweeps the pixels at a rate of 30 frames per second to generate an analog electrical signal in RS-170 video signal format representing the image of the reflected light stripe recorded by the charge coupled devices.

The components of the sensor are arranged to yield a field of view of 4.0 inches by 3.0 inches at a nominal range of 8 inches. The included angle between the stripe plane and the effective camera principal axis is 30 degrees. Using the configuration, the nominal resolution is 7.8 mils.

When the vision system of this invention is used with the windshield insertion system of U.S. Pat. No. 4,670,974, three of the sensors 1 shown in FIG. 1 are used. The sensors can be mounted on the robot end effector which is rigidly attached to the end flange of the robot. By knowing where the robot flange is, and knowing the relationship between the flange and the sensors, it is possible to convert sensor readings into robot sensor information. The present invention is directed to generation of the light stripe and adjusting the digitizing parameters to accommodate for variations in target surface reflectivity. The mathematics then used to determine the robot position relative to the target object such as the windshield opening is known. For instance, reference can be made to commonly owned United States patent application, Ser. No. 288,651, filed Dec. 22, 1988 for "Parametric Path Modeling for an Optical Automatic Seam Tracker and Real Time Robotic Control System", which is a continuation-in-part of application Ser. No. 140,261 filed Dec. 31, 1987, for a description of a system which utilizes the stripe information generated by the present invention.

Figure 3:
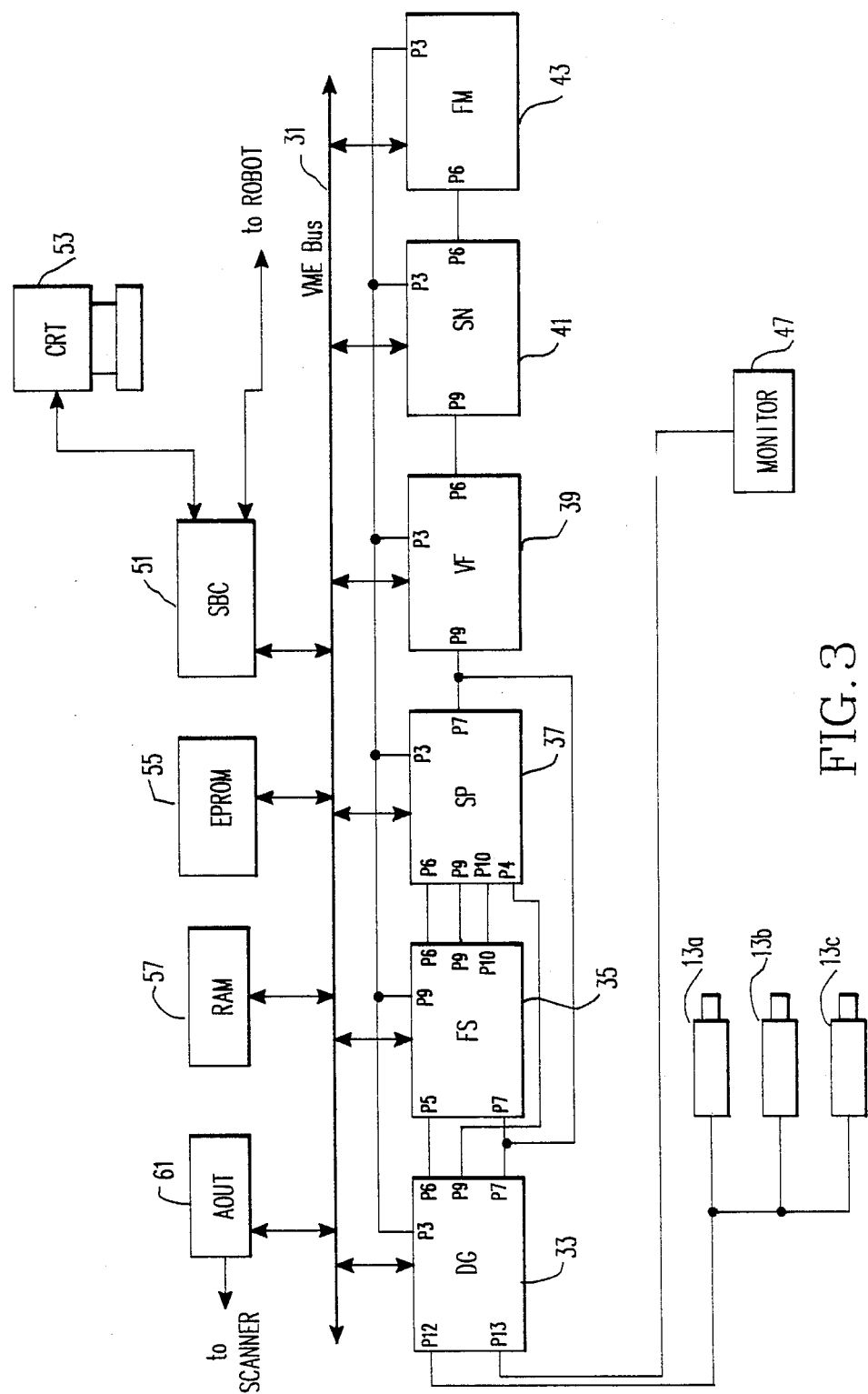
FIG. 3 is a schematic diagram in block form of a vision system incorporating the invention.
Figure 4:
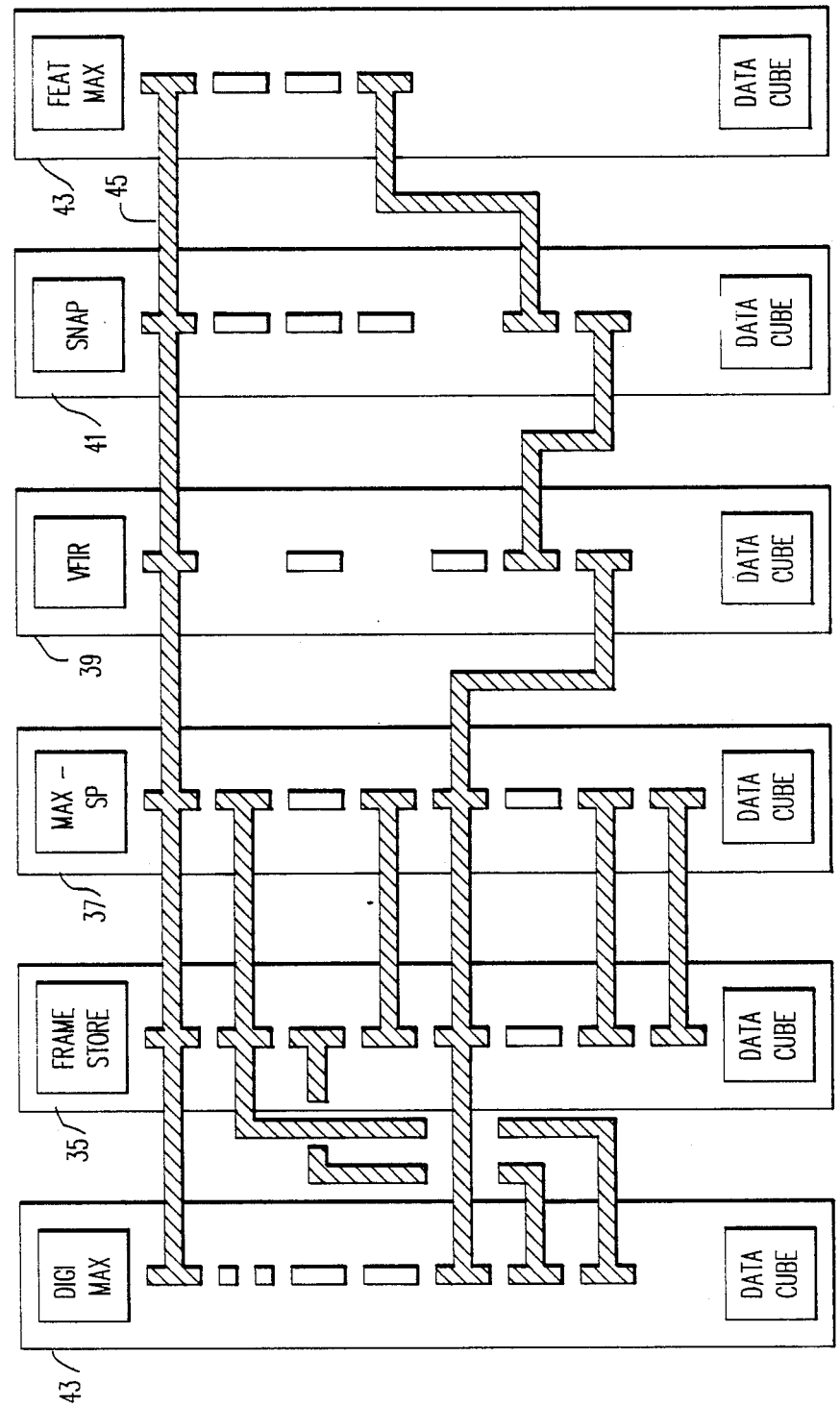
FIG. 4 is a schematic view illustrating the patch arrangement by which certain of the image processing boards of the system of FIG. 3 are connected together.

A block diagram of the vision system of the invention is shown in FIG. 3. The system contains one general purpose and six special purpose processors. The entire system is based on the VME bus, and all boards reside on the bus. The six special purpose processors are all MAXVIDEO image processing boards from Datacube, Inc. These image processing boards are the DIGIMAX (DG) board 33, the FRAMESTORE (FS) board 35, the MAXSP (SP) board 37, the VFIR (VF) board 39, the SNAP (SN) board 41 and the FEATUREMAX (FM) board 43. These boards are connected together and controlled to form a custom configuration designed specifically for light stripe integration and image processing. A digital patch panel arrangement permits custom connections. FIG. 4 illustrates the patch connections such as 45 between these image processing boards. These boards have 512×485×8 bit resolution and all operate on every pixel at full TV frame rates of 30 frames per second.

The DG board 33 digitizes the analog RS-170 signals from the TV camera and can multiplex up to eight camera inputs. As discussed previously, the windshield insertion system employs three cameras 13a, 13b and 13c which provide inputs to the DG board 33. The DG board 33 converts the analog electrical signals from the TV cameras into eight bit gray code digital signals. The DG board 33 also accepts a stream of digital video data and reconstructs this into RS-170 output signals for display on a standard baseband video monitor 47.

The DG board 33 is configured as the sync master for the image processing boards. It also provides an external sync signal to each of the three cameras 13a, 13b and 13c. In addition, the DG board 33 generates all necessary pixel timing for the other boards. It is set up by jumper setting as the video master and timing signals are distributed to all five of the other image processing boards over cable 49.

The FRAMESTORE (FS) board 35 is a triple frame buffer. One of the buffers is completely independent. The other two are coupled together and are generally used to hold 16-bit results of image processing from other boards. In this application, FS board 35 is used as a double FS and performs two functions. The coupled FS provides a buffer to hold the results of integrating of the many frames of data required to produce a light stripe by scanning a laser dot in a manner to be explained more fully later. This buffer is used to hold both the intermediate and final results of the integration. The second function of the FS board 35 is to store graphics which can be routed back to the DG board 33 for display on the monitor 47.

The MAXSP (SP) board 37 is a pixel processor which combines two video streams into one by performing arithmetic or logical operations on pairs of pixels. The SP board 37 is used in conjunction with the FS board 35 to do real-time frame integration as will be explained below.

The VFIR (VF) board 39 is a two dimensional, finite impulse response linear filter board for video signals. It accepts the sync and digital video streams from the DG board 33 and performs a 3×3 convolution on each pixel on each field as it arrives at the board. The board accepts nine 8-bit coefficients in either unsigned magnitude or two's complement form. It accumulates a 20-bit product which is rounded or truncated back to 16 bits. The result is then passed through a programmable barrel shifter for up to three position right shifts (divide by eight). The VF board 39 is set up to execute a simple low pass filter by setting eight of the coefficients to one (the center coefficient is zero). The barrel shifter is set to shift right three places so that the dc gain of the filter is unity. The purpose of this filter is to reduce the high frequency noise generated in the camera and to smooth out the speckle of the laser light stripe. This greatly improves the detectability of the light stripe.

The systolic neighborhood area processor, SNAP (SN) board 41, is a nonlinear or logical filter which processes a 3×3 pixel neighborhood for all pixels. It also accomplishes detection of the stripe. Its purpose in the windshield insertion system is to transform the thick gray scale stripe image from the frame integrator into a binary, thinned version, ideally with the light stripe being only one pixel thick. The SN board 41 treats each 3×3 neighborhood by applying ten comparators (two for the center pixel) to the window. The resulting 10-bit code is used as the address into a 1024 element×8-bit table. The table is programmed to generate a white pixel if the 3×3 neighborhood represents a pixel on the lower edge of the threshold stripe and a black pixel otherwise. There are ten codes or masks that define white outputs.

The FEATUREMAX (FM) board 43 is the last board in the chain. This board performs two separate functions. The first is generation of histogram data on a signal frame laser spot. As will be seen, the intensity of this spot is used to adjust the sensor's digitizing parameters to compensate for various paint finish reflectivities.

The FM board 43 is also used to scan the digital video stream and extract the coordinates of the pixels whose values are defined to be "features." For the windshield insertion system, white pixels are defined as the features to be extracted. The ij coordinates of the pixels are placed in a file on the FM board 43 which is mapped onto the VME bus 31.

The system is controlled by a single board digital computer 51 such as for example a Motorola MVME 133 single board computer. This computer 51 uses an M68020 processor operating at a 12.5 MHz clockrate along with a 68881 floating point chip, two serial ports having full interrupt capability, a real-time clock, 512 Kbytes of RAM, and sockets for up to 128 Kbytes of EPROM. The onboard RAM is dual-ported and is accessible from the VME bus.

The computer 51 supervises the operation of the image processing boards and processes the resultant stripe information for transmission to the ALTER port of the robot in the windshield insertion system. The computer 51 also communicates with a CRT 53 provided with a keyboard.

An EPROM board 55 such as a MIZAR 8205 stores the program for the computer 51. A nonvolatile RAM 57 such as the Pep VMI-1 bubble memory stores system parameters. An analog to digital converter (AOUT) 61 provides control signals to the scanner for positioning the laser dot.

The vision system of the invention is operated in two modes. In the first mode, the system adjusts the digitizing parameters for the reflectivity of the target surface. In the second mode of operation, the system generates the light stripe by advancing the laser beam over a number of frames, and integrating light reflected in each frame to generate an image of the reflection of the light stripe.

Figure 5:
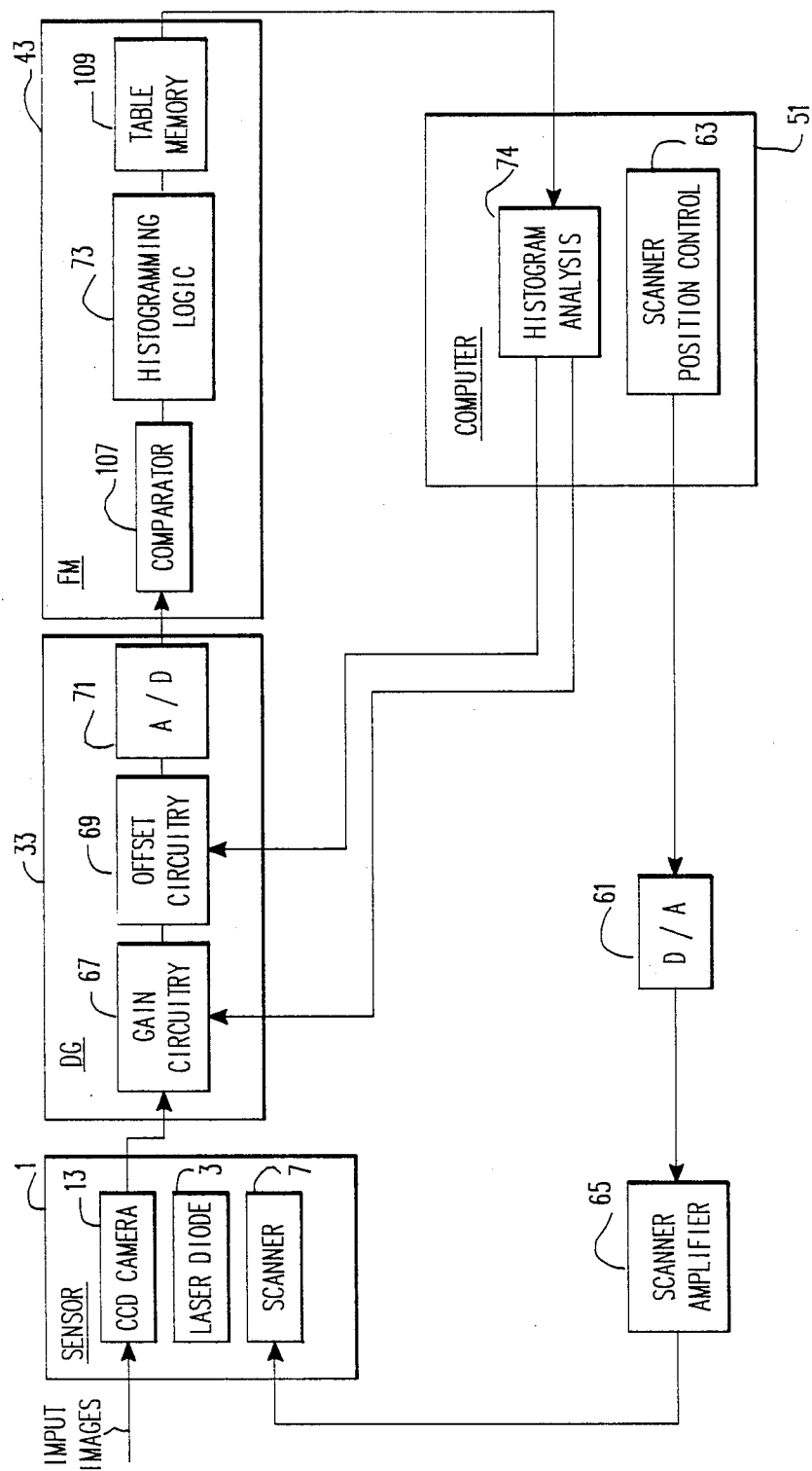
FIG. 5 is a more detailed block diagram of the portions of the system of FIG. 3 which are used in selecting the digitizing parameters for varying target surface reflectivities in accordance with the invention.

In setting the digitizing parameters, only two of the image processor boards, the DG board 33 and the FM board 43 are used. A more detailed block diagram of the portion of the system which automatically detects and adjusts to paint finishes is shown in FIG. 5. In this mode of operation, the position of the galvanometer scanner 7 is held steady so that the camera 13 images a single spot from the laser diode 3. The scanner position is controlled by a routine 63 run by the computer 51. The digital control signal generated by the computer 51 is converted to an analog signal in the digital to analog converter 61 and applied through a scanner amplifier 65 to the servomotor 19 of the scanner 7. The analog RS-170 video signal generated by the camera 13 is applied to the DG board 33 where it is amplified by gain circuitry 67 having programmable gain provided by the computer 51. The amplified analog signal is then applied to offset circuitry 69 which clamps the analog signal, with the variable offset also provided by the computer 51. The processed analog signal is then converted to a digital signal in analog to digital converter 71.

Figure 7:
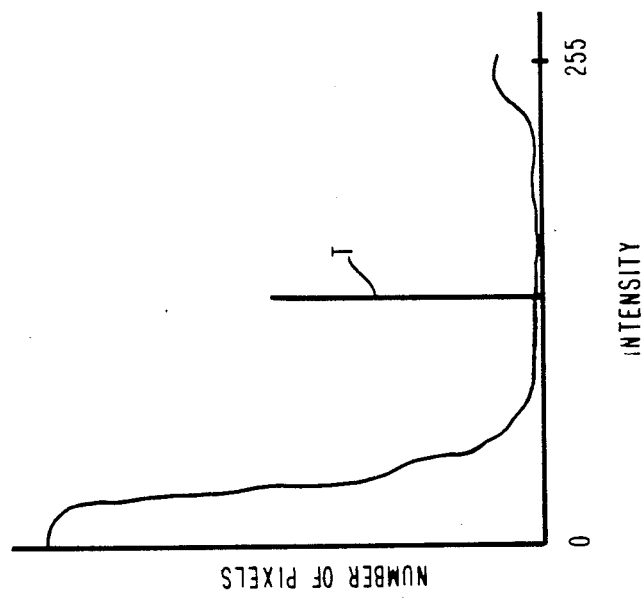
FIG. 7 is a plot illustrating an exemplary distribution of pixel intensities for a black target surface.
Figure 6:
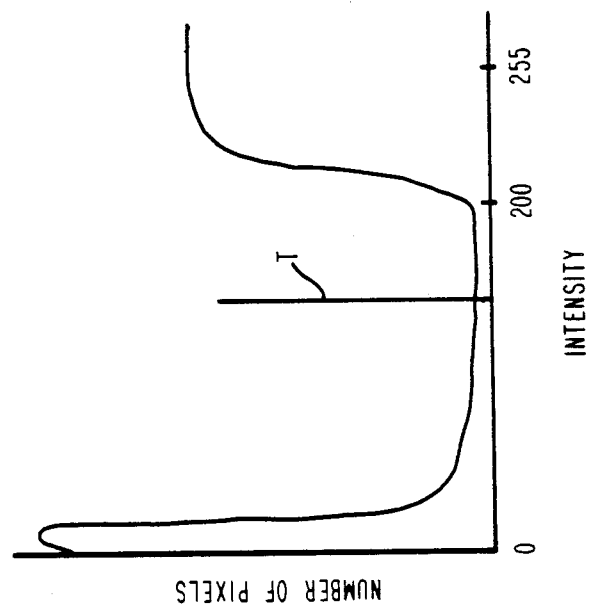
FIG. 6 is a plot illustrating an exemplary distribution of pixel intensities for a white target surface.

The digital video stream is then applied to the FM board 43, which for selecting digitizing parameters applies histogramming logic 73 to the digital value for each pixel. The histogramming logic counts the number of pixels having each of the 256 possible levels of light intensity and stores this histogram data for use by the computer 51. FIG. 6 is a plot of exemplary histogram data for a white car. As can be seen from the figure, a large number of pixels have high intensity levels. FIG. 7 on the other hand is an example of the histogram data for a black car showing that most of the pixels have very low levels of light intensity. The lines T in these figures represent the threshold level used by the computer in analyzing the histogram data.

Figure 8:
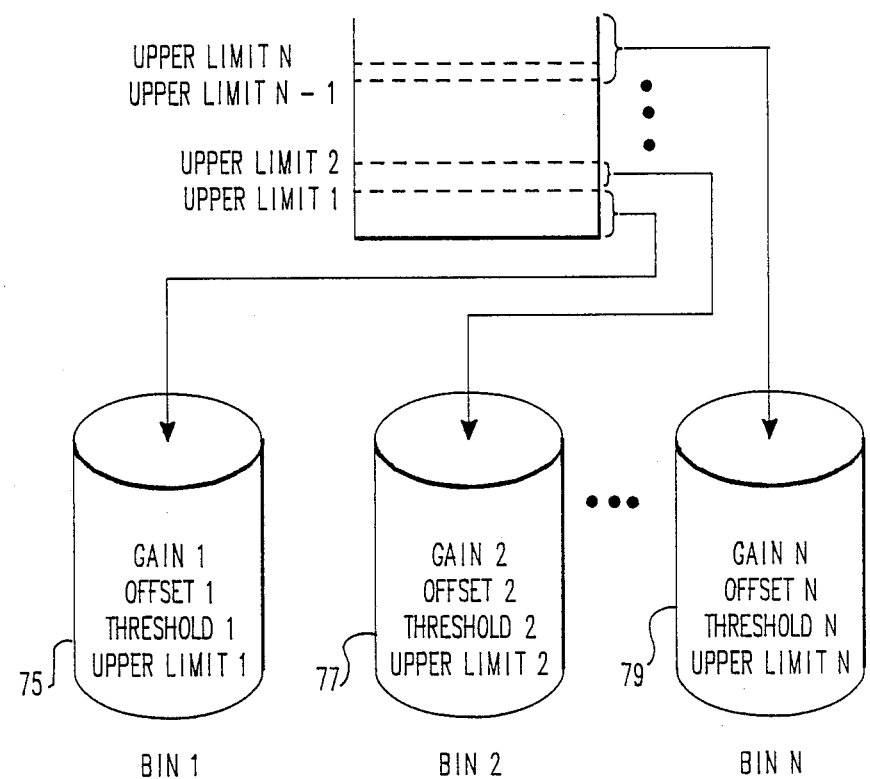
FIG. 8 is a diagram illustrating the arrangement and selection of bins containing digitizing parameters used by the system of FIG. 3.

The histogram data generated by the FM board 43 is processed by the computer 51 as indicated at 74 in FIG. 5. In processing the histogram data, the software of the computer 51 sets up an arbitrary number of bins of editable parameters. As illustrated in FIG. 8, each bin 75, 77, 79, contains the following parameters: gain, offset, threshold, and an upper limit. The gain parameter is the analog gain of the gain circuitry 65 on the DG board 33. The offset adjusts the voltage at which the offset circuitry 69 clamps the analog signal. The threshold is used in a manner to be discussed to identify the stripe in the stripe generation mode. It is also used in bin selection. These three control parameters; gain, offset, and threshold, are adjusted to obtain smooth, thin stripes on a target surface of given reflectivity. Other control parameters could be used in addition to or instead of these parameters. For instance, instead of adjusting the gain of the analog signal, the power output of the laser diode 3 could be adjusted.

The upper limit parameter marks the upper bound of the range of data over which the bin's parameters are valid. The lower bound of the range of data that specifies a given bin is the upper limit of the next lower bin. Of course, the lowest bin's lower boundary is zero, and the highest bin's upper bound is not limited.

One bin of parameters, such as bin 75 in FIG. 8, is used as a reference bin. The reference parameters are used only during the histogram process, not for stripe generation. This is accomplished by setting the upper limit to zero in the reference bin.

Figure 9:
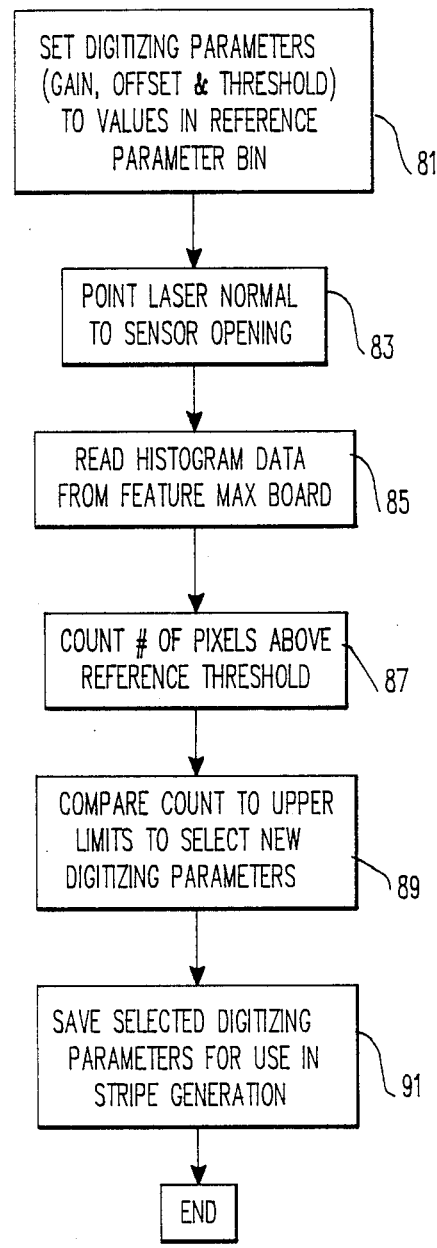
FIG. 9 is a flow chart for a computer program used by the vision system of FIG. 5 to select digitizing parameters in accordance with the invention.

A flow chart of the program by which the computer automatically adjusts the digitizing parameters to surface reflectivity is shown in FIG. 9. As shown at 81, the parameters (gain, offset, and threshold) are set to the values in the reference parameter bin. The laser is then pointed to a fixed position normal to the sensor opening as indicated at 83. The computer then reads the histogram data from the FM board as indicated at 85. As will be recalled, the histogram data provides an indication of the number of pixels having each of the digital intensity levels. A count is made by the computer as indicated at 87 of the number of pixels above the reference threshold level. This count of pixels above the referenced threshold can be envisioned as the fill level of a bucket. The upper limit parameters of the different bins divide the bucket into ranges. One bin of parameters is assigned to each range of data as shown in FIG. 8. The count of pixels above the reference threshold is then compared as at 89 to the upper limits to select the bin containing the new digitizing parameter levels. These selected digitizing parameter levels are then saved for use in stripe generation as indicated at 91.

The values of gain, offset, and threshold that produce a "good", thin, and continuous stripe for a particular set of paint finishes were determined experimentally. Our experiments indicate that three parameter bins will be sufficient to draw crisp stripes on at least six different colored cars. We are currently successfully using one bin of parameters as the reference, one bin for the black cars and one bin for all the other colored cars (blue, red, white, gray, etc.).

In the second mode of operation, the vision system of the invention generates the light stripe 23. This is accomplished by building up the stripe frame by frame over a series of video frames. The laser dot is positioned by the microcomputer and the image data is stored. The laser dot is advanced and the additional image data is added in a recursive manner. In order to generate a continuous stripe, the position of the laser dot is not fixed for each frame, but is advanced very slowly so that the light energy is concentrated over a small stripe segment. Thus, the laser dot continuously tracks across the object but at a rate such that it takes several frames to draw the entire stripe. In the exemplary system, the stripe is drawn over a span of thirty video frames.

Figure 10:
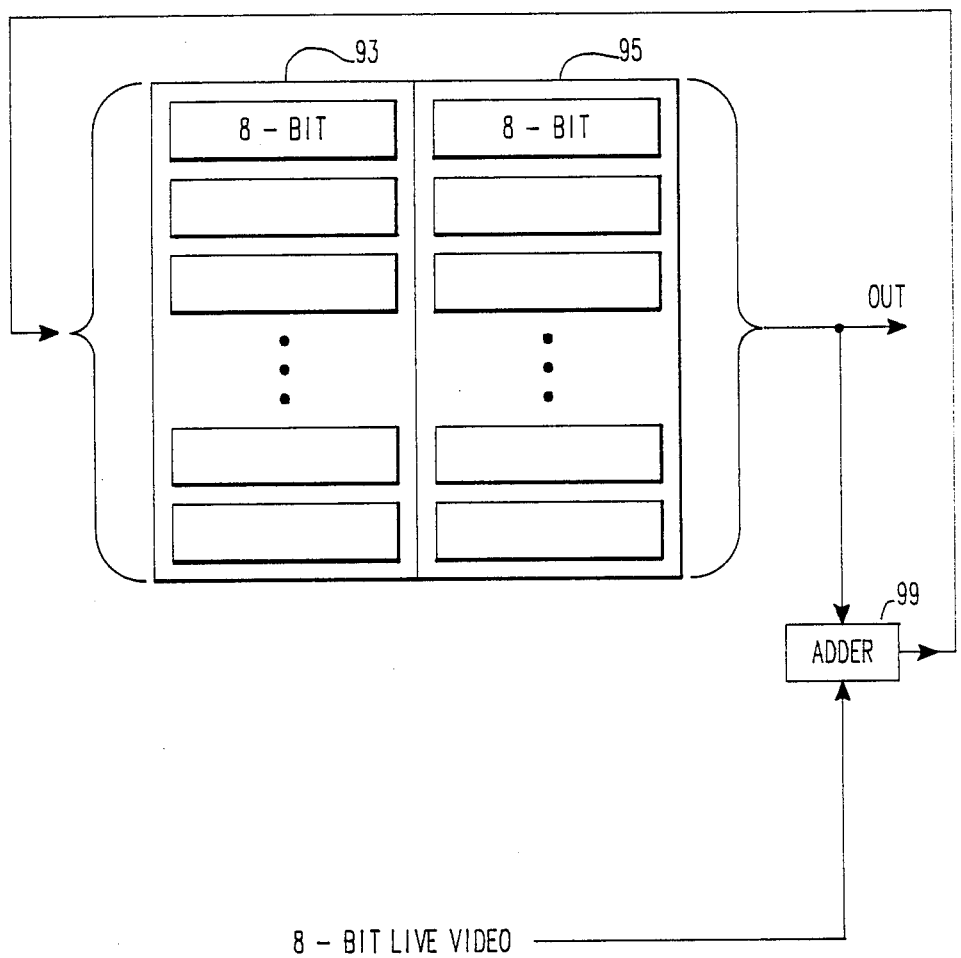
FIG. 10 is a schematic diagram illustrating the arrangement of components used for frame integration to generate a light stripe in accordance with the invention.

All of the image processing boards are used in the stripe generation mode of operation. The analog video signal representing successive frames of the video image is applied to the DG board 33 where the selected gain is applied by the gain circuitry 67 and the selected offset is applied by the offset circuitry 69. The processed analog signal is then converted to a digital signal in the A/D converter 71. The digital data for each pixel is then passed to the FS board 35 for integration of successive frame data. The FS board 35 includes sets of buffers for each pixel. As shown in FIG. 10, two of these buffers 93 and 95 are coupled together to hold 16-bits of processed data. The live video data from the DG board 33 is added to the data in the coupled buffers 93 and 95 for each pixel in an adder 99 in the SP board 37 and the result is returned to the coupled buffers 93 and 95 in the FS board 35.

Figure 11:
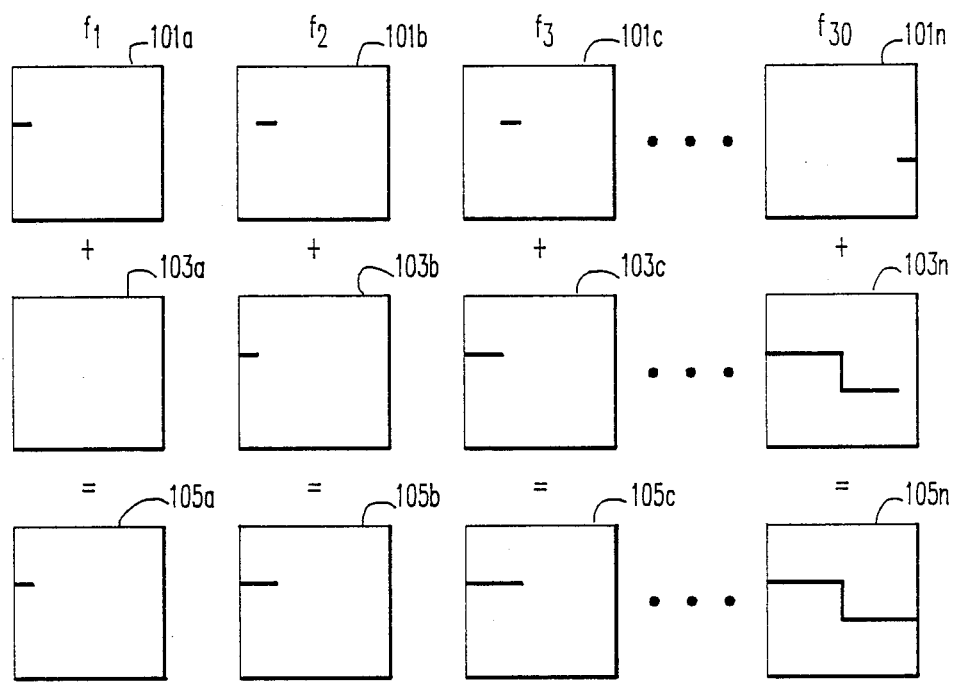
FIG. 11 is a time sequence illustrating the frame integration process carried out by the arrangement of components of FIG. 10.

A time lapsed view of the frame integration process is illustrated in FIG. 11. The horizontal row of FIGS. 101 represents the live video from the camera. The second row of FIGS. 103 illustrates the results already stored in the double frame buffer 93, 95. The third row of FIGS. 105 shows the results of the addition and the new value stored in the double buffer 93, 95. The columns of figures labeled with the subscripts a, b, c, . . . n illustrate the contents of the buffers for each successive time frame f1, f2, f3 . . . fn. FIG. 105$n$ illustrates the full stripe 23 which is developed after 30 frames. The integrated digital values for each pixel are then passed by the coupled buffers 93, 95 to the VF board 39 for filtering, and the SN board 41 for thinning of the stripe. The pixel data for the thinned stripe is then passed to the FM board 43. The digital value for each pixel is compared in a comparator 107 (see FIG. 5) with a threshold level provided by the microcomputer 51 from the selected bin of control parameters. Pixel values which exceed this threshold level are identified as features representing the stripe. The ij coordinates of these pixels are placed in a file in a table memory 109 on the FM board 43. This file is mapped onto the VME bus 31 for direct reading by the computer 51.

Figure 12:
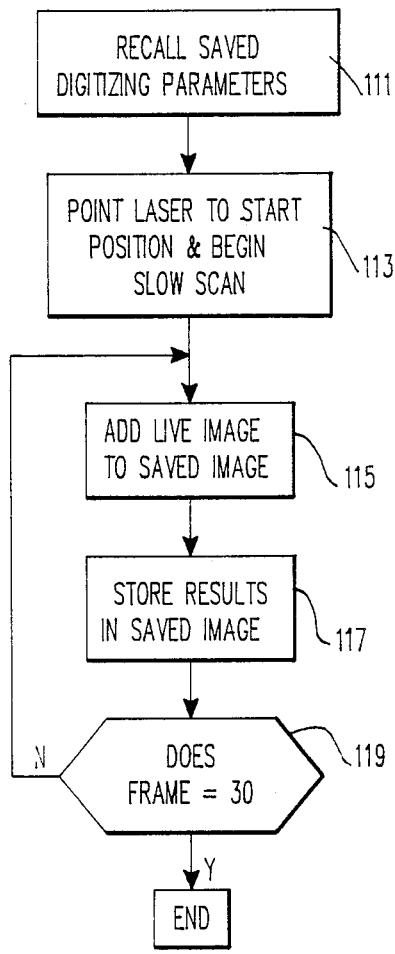
FIG. 12 is a flow chart for a computer program used to generate a stripe using the frame integration process.

A flow chart of the program by which the computer 51 controls generation of the stripe is shown in FIG. 12. Initially, the saved digitizing parameters from a selected bin are recalled at 111. The computer then points the laser to the start position for drawing the stripe and begins a slow scan of the laser beam across the target object as indicated at 113. The computer then sends commands to the FS board 35 and the SP board 37 to add the live video image to the saved image data as indicated at 115. A command is then sent to restore the results in the coupled buffers 93 and 95 as indicated at 117. This process is repeated until all 30 frames have been integrated as indicated at 119 at FIG. 12.

If desired, the system can momentarily revert to the first mode of operation to reselect the appropriate bin of parameters using the reference bin of parameters at selected points as the light beam advances across the target surface to accommodate for changing conditions.

While the vision system of the invention has been described as applied to the windshield insertion system of U.S. Pat. No. 4,670,974, it has application to other installations requiring a vision system, such as for example, robotic seam tracking and deriveting systems. The generalized nature of the invention makes it readily adaptable to other systems in other environments. All necessary modifications to the system needed to compensate for unexpected surface reflectivity can be made by editing parameters. The system does not have to be reprogrammed to allow for new colored surfaces or different lighting conditions. For instance, in the windshield insertion system, the invention allows for separate sets of bins of parameters for each of the light striping sensors in the system. This allows the system to adjust for anomalies such as changes in the laser diode power of the different sensors or lighting conditions that vary with sensor location.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A vision system which accommodates to varying reflectivities of a target surface, said system comprising:
    light source means directing a beam of light at the target surface;
    video camera means having an array of pixels which convert light from said light beam reflected from said target surface into an analog electrical signal representing an image of the light beam on the target surface;
    analog to digital conversion means converting said analog signal into a digital signal containing digital values corresponding to light intensity at each pixel of said array;
    means analyzing said digital values and selecting one of at least two levels of a control parameter as a function of said analysis;
    means responsive to the selected level of said control parameter to adjust said digital value;
    wherein said analyzing means includes means generating histogram data from said digital values for each pixel;
    a computer having storage means storing said at least two levels of said control parameter and being programmed to select said one of said levels of said control parameter as a function of said histogram data;
    said computer storage means including means for storing sets of levels for multiple control parameters and comprising at least two bins, each bin storing a selected level for each of said multiple parameters; and
    wherein one of said multiple control parameters is a threshold level for said digital values and wherein said computer is programmed to select a bin using histogram data.

2. The system of claim 1 wherein said computer storage means stores a reference level for said control parameter in addition to said at least two levels, and wherein said computer is programmed to select said reference level for said control parameter to adjust the level of said digital values generating said histogram data.

3. The system of claim 2 wherein said means responsive to the selected level of the control parameter is variable gain means which adjusts a gain applied to the analog signal, and wherein said control parameter is the gain of said variable gain means.

4. The system of claim 3 wherein said computer storage means stores a reference level for said gain of said variable gain means and wherein said computer is programmed to select said reference level for said gain to adjust the magnitude of the analog signal converted to said digital values used in generating said histogram data.

5. The system of claim 1 wherein said means responsive to the selected level of the control parameter is an offset circuit which adjusts an offset applied to the analog signal converted into said digital signal, and wherein said control parameter is said offset.

6. The system of claim 5 wherein said computer storage means includes means storing a reference level for said offset and wherein said computer is programmed to select said reference level for said offset applied to the analog signal converted to said digital values used in generating said histogram data.

7. The system of claim 1 wherein said computer is programmed to select the set of levels for said multiple parameters in one of said bins as a function of the histogram data and including means responsive to the selected level of each of said control parameters to adjust said digital values.

8. The system of claim 7 wherein one of said multiple parameters is gain and wherein said means responsive to the selected parameters includes gain means applying the selected gain to said analog electrical signal.

9. The system of claim 8 wherein another of said multiple parameters is offset and wherein said means responsive to the selected levels of said control parameters includes offset circuit means applying said offset to said analog electrical signal.

10. The system of claim 9 wherein still another of said multiple control parameters is threshold and wherein said means responsive to the level of the selected parameters includes means selecting pixels as representing said reflected light image, those pixels having a digital value above the selected threshold.

11. The system of claim 7 wherein said computer storage means includes a reference bin storing a set of reference levels for said multiple control parameter, and wherein said computer is programmed to select said reference levels for said control parameters to adjust the level of said digital values used in generating said histogram data.

12. The system of claim 11 wherein said computer is programmed to select said bin using histogram data by determining a count of pixels having digital values above a reference threshold level and selecting a bin based upon said count.

13. A system of claim 12 wherein another of said multiple control parameters is a fill level and wherein said computer is programmed to select a bin based upon said total count by selecting the bin having the highest fill count which is not exceeded by said total count.

14. The system of claim 13 wherein said multiple control parameters include gain and offset and wherein said means responsive to the selected levels of said control parameters include gain means applying the selected gain to the analog electrical signal and offset circuit means applying the selected offset to the analog electrical signal.

15. The system of claim 13 wherein said computer is programmed following selection of said at least one of two bins of parameters to generate an image using pixels having digital values above the threshold level in the selected bin.

16. The system of claim 15 wherein said video camera means converts reflected light into an analog signal representing successive frames of the image of the light beam on the target surface, wherein said light source means advances said light beam across said target surface over a period of several of said frames, and including time integrating means integrating said digital values for said several frames to generate composite digital values, and wherein said computer is programmed following selection of one of said at least two bins of parameters to generate said image using pixels having composite digital values above said threshold level in the selected bin.

17. The system of claim 16 wherein said computer is programmed to, at selected points in the advance of said light beam across said target surface, reselect one of said at least two bins of parameters using said parameters in said reference bin.

18. A vision system comprising:
light source means directing a beam of light at a target surface;
video camera means having an array of pixels converting light from said light beam reflected from the target surface into an analog electrical signal representing successive frames of an image of the light beam on said target surface;
means advancing said light beam across said target surface over a period of several frames to draw a stripe on said target surface;
analog to digital conversion means converting said analog signal into a digital signal containing digital values corresponding to light intensity at each pixel in said array for each frame;
time integrating means integrating the digital values of said digital signal for each pixel for said several frames to generate composite digital values for each pixel;
means for selecting a threshold value of said composite digital values as a function of a level of reflectivity associated with said target surface, said selecting means selecting a particular threshold value from at least two possible threshold values depending on such level of reflectivity; and
processing means identifying pixels having composite digital values above said selected threshold value as representing the stripe on said target surface.

19. The system of claim 18 wherein said time integrating means comprises for each pixel a save buffer, and means adding digital value of said digital signal for each successive frame to the contents of the save buffer for each frame and storing the sum in the save buffer as said composite digital value.

20. The system of claim 18 including means generating histogram data from said digital values for each pixel for a reference frame and a digital computer having memory means storing said at least two threshold values.

21. The system of claim 20 wherein said memory means stores a reference threshold level in addition to said at least two levels and wherein said digital computer is further programmed to select said reference threshold level as said selected level for said reference frame and is programmed to select one of said at least two threshold levels as a function of the histogram data generated using the reference threshold level.

22. The system of claim 20 wherein said memory means includes a plurality of bins each storing a value for said threshold level and a value for a gain, and wherein said computer is further programmed to select the threshold level and the gain level from a selected bin as a function of said histogram data, and including means for applying the selected gain level to said analog electrical signal.

23. The system of claim 22 wherein said memory means includes bins each storing an offset level in addition to a threshold level and a gain level and wherein said computer is programmed to select the offset level from the selected bin as well as the threshold level and gain level as a function of the histogram data and including offset circuit means applying the selected offset to said analog electrical signal.

* * * * *